Dec. 16, 1941.    J. B. SANDERSON    2,266,085
HYDRAULIC POWER TRANSMISSION DEVICE
Filed April 25, 1939    4 Sheets-Sheet 2

Inventor
James B. Sanderson
By Carl Miller
Attorney

Dec. 16, 1941.   J. B. SANDERSON   2,266,085
HYDRAULIC POWER TRANSMISSION DEVICE
Filed April 25, 1939   4 Sheets-Sheet 3

Inventor
James B. Sanderson
By Carl Miller
Attorney

Dec. 16, 1941.   J. B. SANDERSON   2,266,085
HYDRAULIC POWER TRANSMISSION DEVICE
Filed April 25, 1939   4 Sheets-Sheet 4
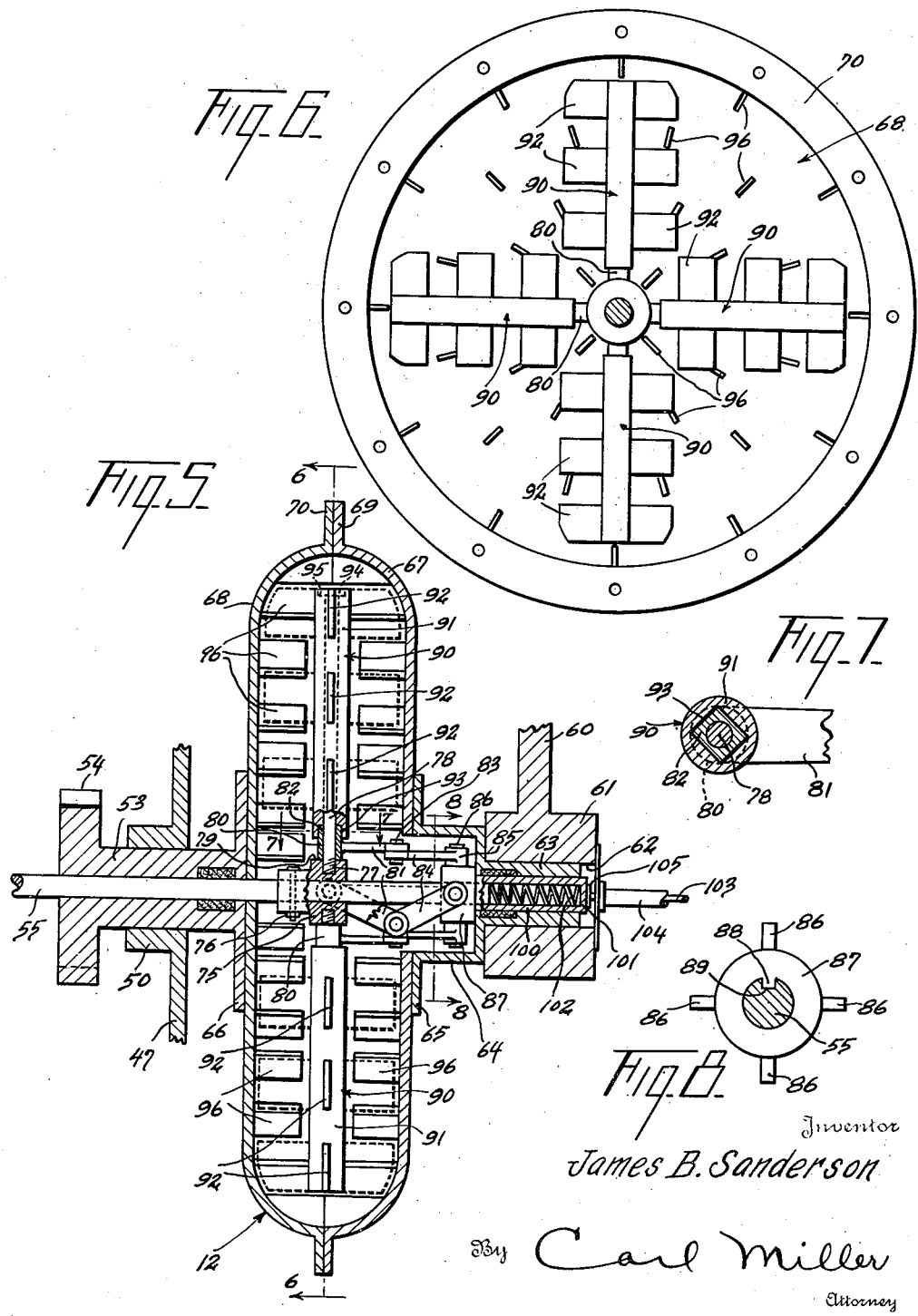

Patented Dec. 16, 1941

2,266,085

UNITED STATES PATENT OFFICE 2,266,085

HYDRAULIC POWER TRANSMISSION DEVICE

James B. Sanderson, Delphi, Ind.

Application April 25, 1939, Serial No. 269,878

7 Claims. (Cl. 74—293)

This invention relates to a hydraulic power transmission device, and more particularly to a power transmission device adapted for use in conjunction with internal combustion engines of motor vehicles, tractors or the like.

The principal object of this invention is to provide a hydraulic transmission designed to eliminate the conventional shifting gear transmission and of such a nature that the driving element may be operated at various engine speeds, while permitting the driven element to vary its movement in accordance with load conditions, said driven element moving at low speed and with high torque when the load is heavy, corresponding to low gear; and with lower torque and higher speed as the load decreases, corresponding to high gear.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Figure 1a is a side elevational view of the hydraulic transmission unit.

Figure 5 is a vertical view of hydraulic control unit.

Figure 6 is a vertical interior view thereof taken on line 6—6, Figure 5.

Figure 7 is a detail sectional view taken on line 7—7, Figure 5.

Figure 8 is a detail sectional view taken on line 8—8, Figure 5.

Figure 9 is a longitudinal sectional view of gear arrangement taken on line 9—9, Figure 2.

Figure 10 is an end view of gear carrying cone.

Figure 1:
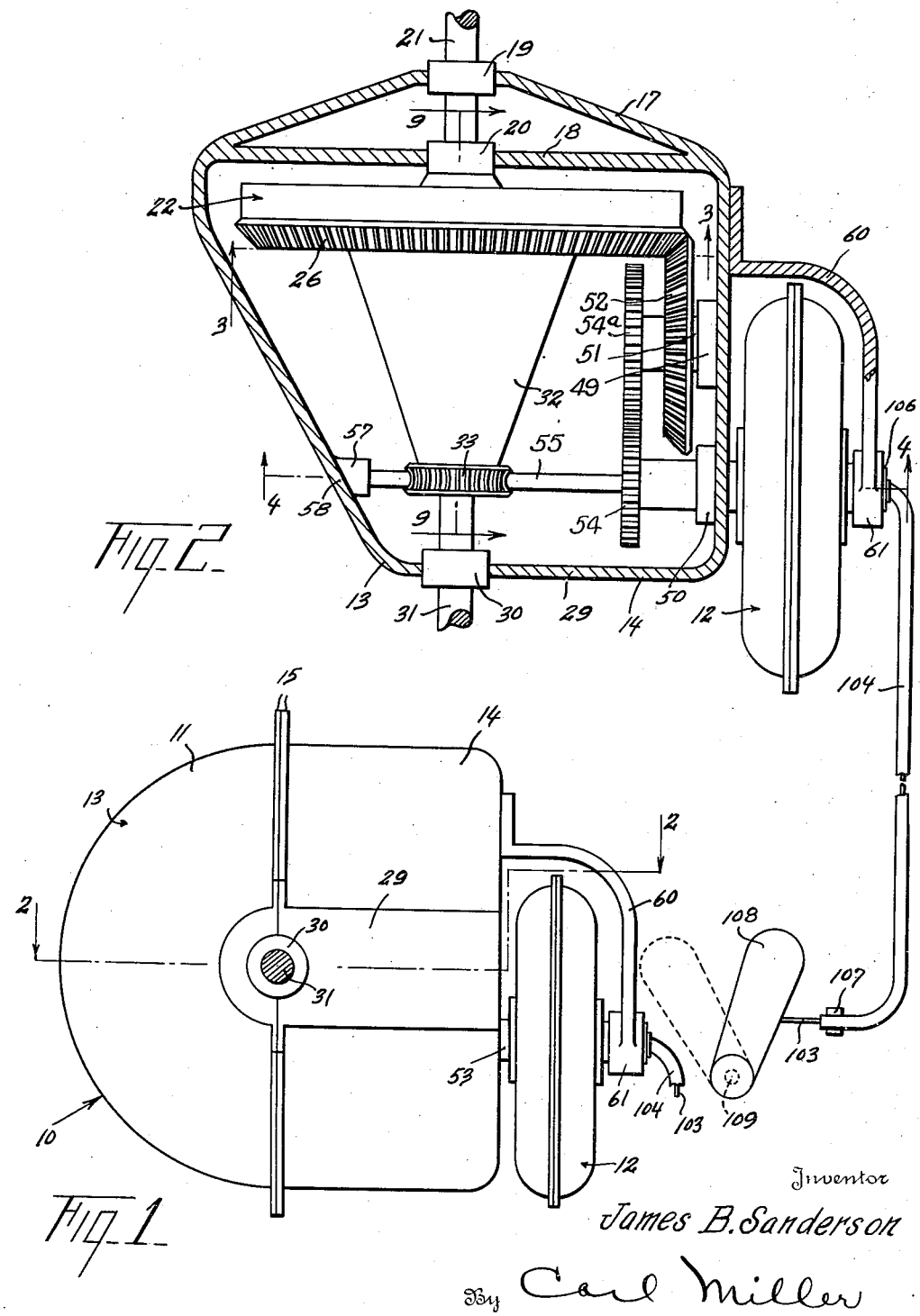
Figure 1 is a front elevational view of the hydraulic transmission unit.

Referring to the drawings wherein like numerals of reference designate corresponding parts throughout all the figures, 10 indicates the hydraulic transmission device which comprises a housing 11 which contains the gear mechanism of the device and a housing 12 which contains the hydraulic control mechanism for the transmission. The gear housing 11 comprises two parts 13 and 14 having abutting flanges 15 at the vertical longitudinal center plane thereof which are rigidly joined together by means of bolts 16, see Figure 1a. Both the rear wall 17 of the gear housing 11 and a supporting wall 18 interiorly thereof are provided with suitable anti-friction bearings 19 and 20, respectively which support one end portion of a drive shaft 21 that is operatively connected to the engine (not shown). The end of the drive shaft 21 projects beyond the bearing 20 and has mounted thereon a ring gear 22 which is rigidly secured to the end of the drive shaft 21 by means of a key 23. The ring gear 22 is formed to provide a flanged rim 24 which carries an inner circular row of gear teeth 25 and an outer row of bevel gear teeth 26.

Mounted on the front wall 29 of the gear housing 11 is an anti-friction bearing 30 arranged coaxial with the bearings 19—20 for rotatably supporting a driven shaft 31. Surrounding the driven shaft 31 within the housing 11 is a cone member 32 the base of which is disposed adjacent the ring gear 22. The cone 32 carries at its apex a worm wheel 33 provided with a hub 34 that extends into the open apex end of the cone, said hub being rigidly secured to said cone in any desired manner as for example by welding as at 35, whereby both cone and worm wheel will move as a unit, for a purpose to be hereinafter described. The hub 34 of the worm wheel 33 is provided with an axial bore 36 through which the driven shaft 31 extends, said hub providing a bearing support for the end of the cone as well as for the worm wheel on said shaft.

The driven shaft 31 extends outwardly of the gear housing 11 for connection to the vehicle propeller shaft or drive axle (not shown), the inner end of the driven shaft 31 being disposed within the ring gear 22, see Figure 9, and carries a pinion gear 38 rigidly secured thereto as by a key 39. Projecting from the base 40 of the cone 32 are three trunnions 41 arranged 120° apart see Figure 10, with their axes parallel to the axis of the cone and driven shaft. The trunnions 41 are rigid with the base of the cone and are each provided with a reduced diameter bearing portion 42 and a reduced diameter threaded extension 43 carrying a nut 44.

Rotatably mounted on each of the bearing portions 42 of the trunnions 41 is a gear 45 each of which is held in place by means of the nut 44, the gears 45 being of such a size as to mesh both with the center pinion 38 and the inner annular row of teeth 25 on the ring gear 22 thereby forming an epicyclic gear train of the planetary type.

The side wall 47 of the housing part 14 is provided with a pair of inwardly directed bearing bosses 49 and 50. Rotatably mounted in the bearing boss 49 is a stub shaft 51 carrying a bevel gear 52 arranged to mesh with the bevel gear 26 of the ring gear 22. The bearing boss 50 is disposed below the horizontal plane of the boss 49 and rotatably supports a sleeve 53 which extends beyond each side of the bearing boss and carries on its inner end a spur gear 54 arranged to mesh with a spur gear 54ª fixed in co-axial relation to the bevel gear 52 inwardly thereof and movable therewith for a purpose to be hereinafter described. Extending through the sleeve 53 for rotative movement therein is a shaft 55 which carries a worm 56 meshing with the worm wheel 33, the inner end of the shaft 55 being supported by the bearing 57 carried by the side wall 58 of the housing part 13.

For controlling the speed of the driven shaft 31 there is provided a hydraulic control device contained within the housing 12 which is disposed to one side of the gear housing 11 adjacent the wall 47 thereof. Secured to the wall 47 is a bracket 60 which terminates in a boss 61 arranged co-axial with the axis of the bearing boss 50. The boss 61 is provided with an axial bore 62 into which rotatably extends a sleeve 63 formed as an integral axial extension of a cylindrical cap 64 having a flanged end 65. A like flanged end 66 is formed on the end of the gear sleeve 53. The hydraulic housing 12 is made up of two identical dish shaped housing shells 67 and 68 having abutting flanges 69—70, which are securely attached together by means of bolts or other suitably fastening means (not shown). The flanges 65 and 66 are co-axially rigidly secured respectively, to the housing shells 67 and 68 in any desired manner (not shown) whereby the hydraulic housing 12 is rotatably supported by the gear sleeve 53 and cap sleeve 63, respectively in the bearing bosses 50 and 61, as clearly shown in Figure 5.

The shaft 55 carrying the worm wheel 56 freely extends through the gear sleeve 53 and axially across the hydraulic housing 12, the outer end of the shaft 55 terminating within the bore of the cap sleeve 63. Arranged on the shaft 55 in the vertical center plane of the housing 12 is a collar 75 that is rigidly secured to said shaft by means of the pin or rivet 76. The collar 75 is provided with four diametrically opposed threaded openings 77 arranged at right angles to each other, each adapted to threadedly receive the threaded end of a rod 78. Surrounding the base of each rod 78 for pivotal movement thereon and seated on a corresponding flat face 79 of the collar 75 is the link eye 80 of a link 81, each link eye being formed at its upper end with a non-circular or squared end portion 82 for a purpose to be hereinafter described. The links 81 are of identical dimensions and are each pivotally connected at their other ends as at 83 to adjacent ends of links 84. The links 84 at their other ends terminate in link eyes 85 that are pivotally mounted on the radial pins 86 arranged diametrically opposite and at right angles to each other provided on a sliding collar 87 carried by the shaft 55, each pair of connected links 81—84 thus constituting a toggle linkage permitting movement of the sliding collar 87 towards and away from the fixed collar 75. To retain the relationship of the sliding collar 87 with reference to the fixed collar 75, the former is provided with a key 88 operating in a groove 89 formed in the shaft 55, this relationship being such that the corresponding rods 78 and pins 86 are retained in the same longitudinal planes.

Seated on each link eye 80 is a vane carrier 90 comprising a tubular support 91 provided with a plurality of vertically spaced vanes 92 arranged in the same plane, each support being preferably provided with three pairs of vanes, see Figure 6. The base of the tubular support 91 is formed to provide a squared recess 93 adapted to receive therein the spared end 82 of the link eye 80, the tubular support 91 being fixedly held on the link eye by the rod 78 which is provided at its upper end with a head 94 seated within the recess 95 provided therefor in the upper end of the tubular support. It is to be understood that the four vane carriers 90 are each mounted in the same position on the fixed collar 75 through the intermediary of the link eyes 80. Thus as the sliding collar 87 is axially moved on the shaft 55 there will be imparted a turning movement of each of the links 81 and link eyes 80 so as to simultaneously rotate the vane carriers 90.

Arranged on the interior of the walls of the hydraulic housing 12 are laterally extending radially inclined fins 96 which are so positioned as to fit between the vanes 92, said fins functioning to impart a rotary motion to the body of liquid contained within the housing 12 as the same is rotated. The fins 96 are so dimensioned and positioned with reference to each other as to allow the angular movements of the vanes 92 relative thereto upon rotation of the vane carriers 90.

Figure 2:
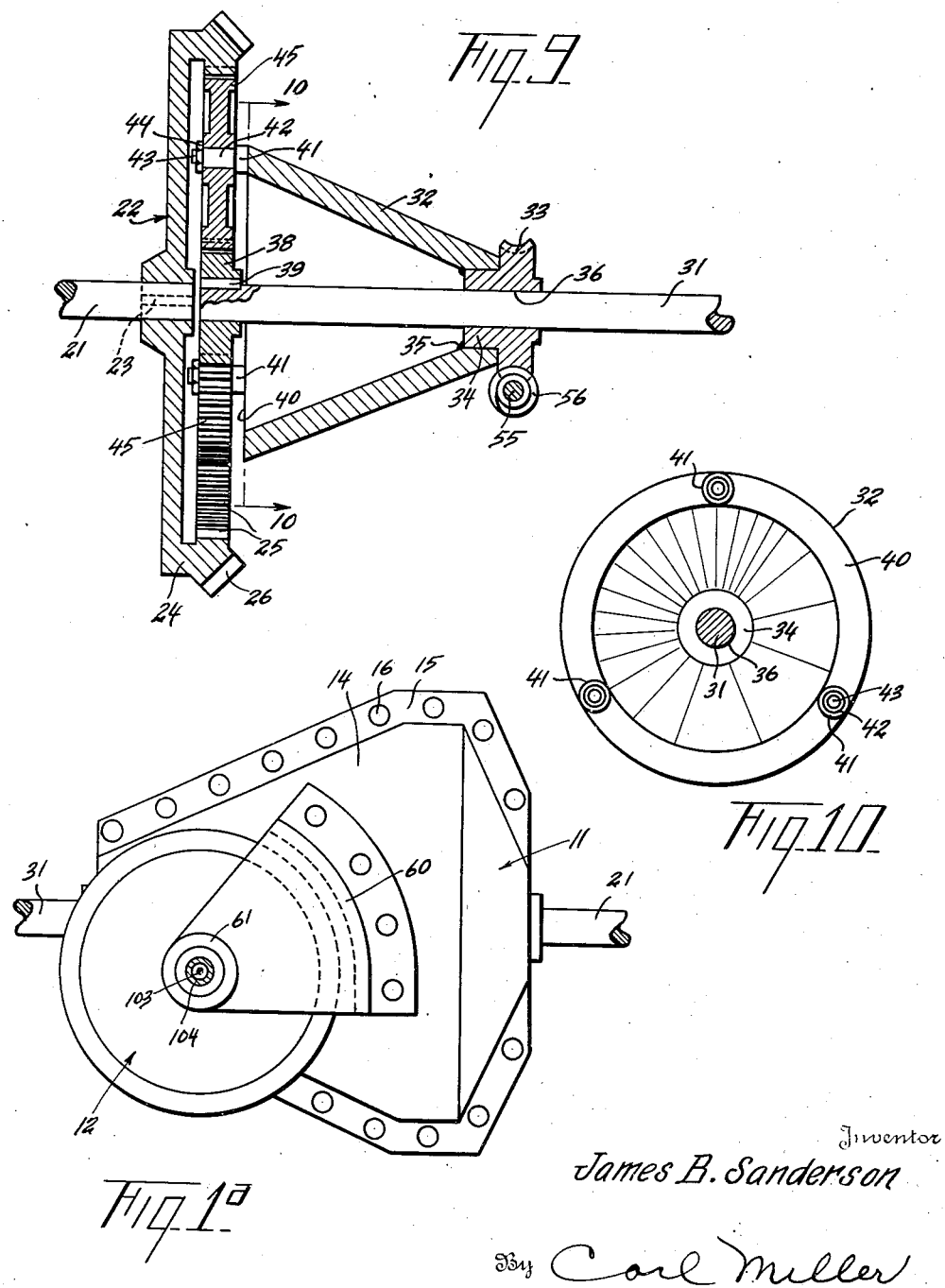
Figure 2 is a horizontal transverse sectional view taken on line 2—2, Figure 1 showing the interior gear arrangement.
Figure 3:
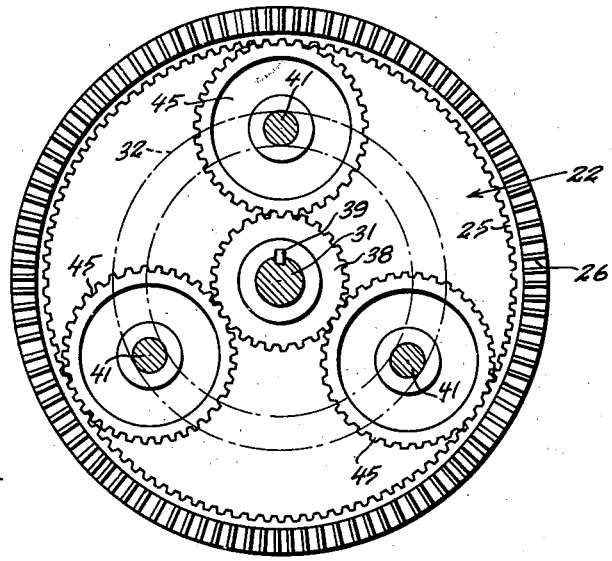
Figure 3 is a detail sectional view of the planetary gear drive taken on line 3—3, Figure 2.
Figure 4:
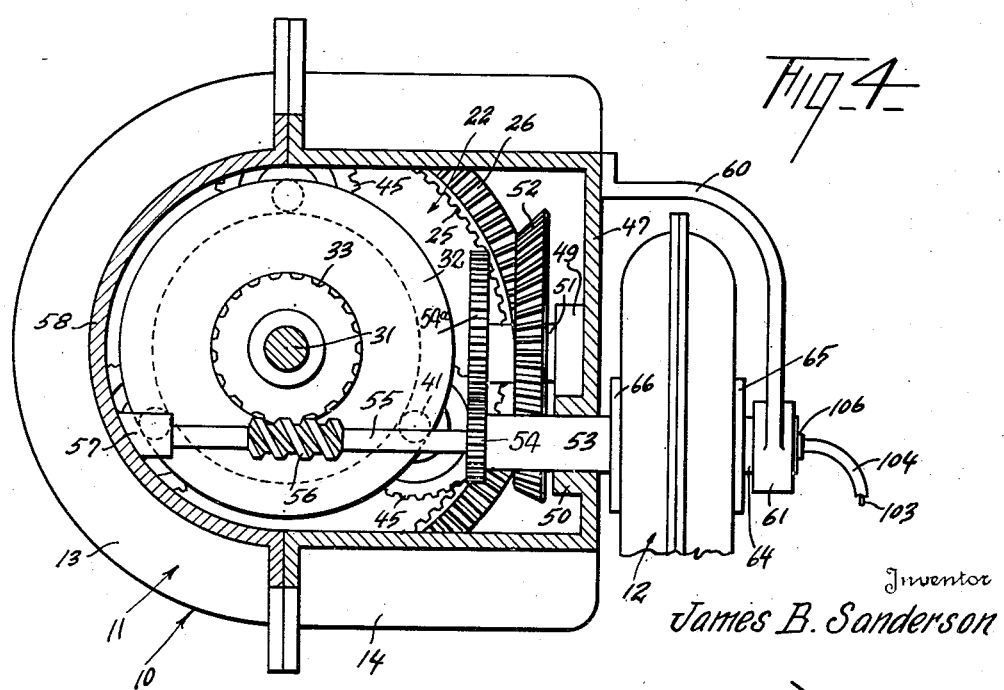
Figure 4 is a vertical sectional view taken on line 4—4, Figure 2 showing the interior gear arrangement.

The sliding collar 87 is under the control of the operator of the vehicle. Thus, the sliding collar 87 is provided with an axial sleeve extension 100 formed rigid therewith adapted to slidably receive therein the end of the shaft 55, said sleeve having an end wall 101. A compression coil spring 102 within the sleeve 100 engages at its ends the terminal end of the shaft 55 and the end wall 101 and acts to return the sliding collar 87 to its initial position upon release of the force moving the same inwardly. A flexible cable 103 operating within a flexible casing 104 is provided with a head 105 adapted to bear against the end wall 101, the end of the casing 104 being secured in any desired manner as by the bracket 106 to the boss 61. The other end of the casing 104 is secured by a bracket 107 to the vehicle floor boards (not shown) adjacent a pivotally mounted foot pedal 108, see Figure 2, the ends of the flexible cable 103 being connected in any desired manner to said foot pedal. The foot pedal 108 is pivotally supported at its heel end as at 109 whereby said pedal is permitted an oscillatory movement between the full line and dotted line positions shown.

The hydraulic transmission device operates as follows:

The drive shaft 21 connected to the vehicle engine is rotating at a predetermined speed and turns the ring gear 22, which through the bevel gear train 26, 52 and spur gear train 54ª, 54 rotates the hydraulic casing 12. With the hydraulic control mechanism in inoperative position, the vane carriers 90 are disposed with the vanes 92 lying in the central longitudinal plane of the hydraulic housing, see solid line position Figure 5, and also as shown in Figure 6. In this position the vanes 92 offer no resistance to the rotational flow of the liquid in the housing 12, said vane carriers 90 being therefore immovable by virtue of which the shaft 55 is held stationary to thereby hold the cone 32 in locked position. With the cone 32 held locked, the gear 25 rotates gears 45 carried by cone 32 which in turn rotate pinion 38 to rotate the driven shaft 31, this being equivalent to high speed.

In order to decrease the rotational speed of the driven shaft 31, the operator moves the foot pedal 108 from its initial dotted line position to the right which movement is transmitted through the cable 103 to force the sleeve 100 and sliding collar 87 inwardly along the shaft 55. The approach of the sliding collar 87 towards the fixed collar 75 will cause a turning of the links 81 to impart a simultaneous rotative movement to the vane carriers 90. As the vanes 92 are turned into the path of rotational flow of the liquid in the rotating hydraulic housing 12, the reaction set up will impart a rotational movement to the vane carriers 90 which because of their rigid connection to fixed collar 75 will transmit a rotational movement to the shaft 55. Rotation of the shaft 55 will through the worm 56 and worm wheel 33 transmit a rotational movement to the cone 32 to thereby cause bodily rotating movement of the gears 45 carried thereby about the pinion 38, thus causing a decrease in the rotational speed of the driven shaft. The decrease in speed of the driven shaft 31 is directly proportional to the increase in rotational speed of the cone 32 carrying the gears 45 and to the degree of angular movement of the vane carriers 90, becoming a minimum (i. e. low speed) when the vane carriers 90 are rotated through 90° so that the vanes 92 are transverse to the housing 12 and parallel to the shaft 55. Any suitable means (not shown) may be provided for holding the foot pedal 108 and cable 103 in any selected adjusted position if desired. Upon a gradual release or return movement of the foot pedal 108, the coil spring 102 will act to move the sleeve 100 and sliding collar 87 outwardly thus causing the vane carriers 90 to turn backwardly, to thereby effect an increase in the speed of the driven shaft 31, reaching a maximum (high speed) when the vanes 92 are moved into inoperative position, see Figure 6.

There is thus provided a smooth increase in the range of speed of the driven shaft that is easily and quickly controlled as compared to the "second" and "high" gear speeds of a conventional transmission. The range of speed possible with this transmission is greater than that of the conventional transmission, and any speed between the minimum (low speed of the driven shaft with hydraulic transmission operative) to the maximum as above set forth, may be selected for operation by the operator. This transmission also eliminates the need of a clutch and as the vanes 92 are brought to a frictionless position, as in Fig. 6, the vehicle will have received its increase in gear ratio.

Having thus described my invention, I claim as new and desire to secure by Letters Patent:

1. A transmission device connecting a driving shaft with a driven shaft comprising a planetary gear arrangement interconnecting said shafts including an annular gear fixed to the driving shaft, a pinion fixed to the driven shaft and a plurality of spaced bodily movable gears meshing with said annular gear and pinion whereby rotation of said driving shaft will drive said driven shaft at a predetermined high speed; a cone surrounding said driven shaft including means on its base for supporting the bodily movable gears in fixed angular relation, hydraulic means connected with said cone for rotating the same, and manual control means for controlling the hydraulic means whereby to progressively regulate the rotational speed of said cone and to thereby provide for a progressive decrease in the rotational speed of said driven shaft below its predetermined high speed.

2. The transmission device as set forth in claim 1, said hydraulic means comprising a casing containing a liquid gear means connecting said casing with said drive shaft for rotating the same, a shaft axially supported by said casing, vanes carried by said shaft, gear means connecting said shaft to said cone, the rotation of said shaft being effected by an angular adjustment of said vanes under the control of said manual control means.

3. The transmission device as set forth in claim 1, said hydraulic means comprising a casing containing a liquid, a gear train connecting said casing with said drive shaft, a shaft axially supported by said casing, radial vane carriers each including at least one pair of vanes rigid with said shaft, a gear connection between said shaft and cone, a pivotal linkage interconnecting said manual control means with said vane carriers for effecting angular movement of said vanes relative to the axis of said shaft within predetermined limits, whereby for one such angular limit of said vanes said shaft will be immovable, said shaft being given a progressive increase in rotational speed to a maximum as the vanes are moved to the other angular limit.

4. A transmission device for connecting a driving shaft with a driven shaft comprising a gear casing co-axially supporting therewithin adjacent end portions of said shafts, a ring gear comprising an outer bevel gear and an inner spur gear fixed to said driving shaft, a pinion in the plane of said spur gear fixed to said driven shaft, a cone rotatably mounted on said driven shaft with its base adjacent said ring gear, a plurality of gears carried by said cone base in fixed angular relationship interconnecting said spur gear and pinion whereby rotation of said driving shaft will drive said driven shaft at a predetermined high speed; a hydraulic casing supported exteriorly of and to one side of said gear casing, a gear train operatively connecting said outer bevel gear of said ring gear with said hydraulic casing for rotating the same simultaneously with rotation of said driving shaft, a shaft member extending transversely through said gear casing and axially through said hydraulic casing, a worm and worm wheel connection between said shaft member and cone, impeller means within said hydraulic casing for effecting rotation of said shaft member, and manual control means for operating said impeller means whereby to operate said shaft member from a stationary position to a predetermined maximum rotational speed to effect a corresponding speed control of said cone to thereby provide a corresponding decrease in the rotational speed of said driven shaft below its predetermined high speed.

5. The transmission device as set forth in claim 4, wherein said impeller means within the hydraulic casing comprises radial vane carriers including at least one pair of vanes rigid with said shaft member, a pivotal linkage interconnecting said manual control means with said vane carriers for effecting angular movement of said vanes relative to the axis of said shaft member within predetermined limits, whereby for one such angular limit of said vanes, said shaft member will be immovable, said shaft member being given a progressive increase in rotational speed to a maximum as the vanes are moved to the other angular limit.

6. The transmission device as set forth in claim 4, wherein said impeller means is mounted for rotational movement on said shaft relative to the axis thereof, means on said shaft for simultaneously rotating said impeller means, said manual control comprises a pivotally mounted oscillatable foot pedal, and flexible cable connecting said foot pedal to said impeller rotating means to operate the same.

7. The transmission device as set forth in claim 4, wherein said gear train includes a bevel gear meshing with said outer bevel gear, a spur gear co-axial with said bevel gear and rotatable therewith, a sleeve portion extending through a wall of said gear casing, a spur gear on the inner end of said sleeve portion meshing with said first mentioned spur gear, bearing means supporting said sleeve portion, a bracket fixed to said wall having a boss arranged co-axial to said sleeve portion, a sleeve rotatably mounted in said boss, said hydraulic casing being disposed between said sleeve portion and sleeve and rigidly connected thereto, said shaft member being rotatably supported by said sleeve portion and sleeve.

JAMES B. SANDERSON.